UNITED STATES PATENT OFFICE.

WILLIAM T. BUSH, OF UNION CITY, TENNESSEE.

IMPROVEMENT IN THE MANUFACTURE OF SOAP FOR SHAVING, TOILET, &c.

Specification forming part of Letters Patent No. 129,525, dated July 16, 1872.

*To all whom it may concern:*

Be it known that I, WILLIAM T. BUSH, a citizen of Union City, Obion county and State of Tennessee, have invented a new and Improved Toilet and Shaving Soap; and I do hereby declare that the following is a clear, full, and exact description and statement of the composition and manufacture of the same.

The nature of my invention consists in the preparation of a toilet-soap which not only removes dirt readily, but which softens and preserves the fine texture of the skin and prevents the hands from chapping. This soap will also prove a valuable acquisition to the gentlemen's toilet as a shaving-soap of superior quality.

To enable others skilled in the art to make and use my invention, I will proceed to describe the mode in which I make it.

Put into a kettle seven gallons of soft water, three pounds of soda ash, and three pounds of unslaked lime. Boil these ingredients thirty minutes, and pour into another vessel to allow the mixture to settle; pour back the clear liquid into the kettle and add seven pounds of common soap-grease; boil for two hours, and then add two gallons of cold soft water; again boil one hour, and then add one ounce of borax and set off the vessel to cool; next, add one-half ounce of liquid ammonia and one-half ounce spirits of turpentine. The soap is ready for use when cold.

This proportion and quantity of ingredients will make about thirty pounds of superior toilet and shaving soap, which may be colored and perfumed to suit the fancy.

The differences between this soap and that covered by Letters Patent to me numbered 94,073, and dated August 24, 1869, is the smaller proportions of water, borax, and turpentine, and the absence of any sal-soda. It is these differences which produce a toilet-soap of good quality.

Having thus described my invention, what I claim as new, and desire to secure by Letters Patent, is—

The combination of the said ingredients when the same are manufactured into soap, substantially as set forth.

WILLIAM T. BUSH.

Witnesses:
J. Q. STANBROUGH,
C. C. WILKINS.